(No Model.)

H. WINTER.
GEARING LUBRICATOR.

No. 276,987. Patented May 1, 1883.

Witnesses.
Jacob S. Van Wyck
Thomas Hunt.

Inventor,
Herman Winter

UNITED STATES PATENT OFFICE.

HERMAN WINTER, OF BROOKLYN, NEW YORK, ASSIGNOR TO THE AMERICAN SHIP-WINDLASS COMPANY, OF PROVIDENCE, R. I.

GEARING-LUBRICATOR.

SPECIFICATION forming part of Letters Patent No. 276,987, dated May 1, 1883.

Application filed March 29, 1883. (No model.)

*To all whom it may concern:*

Be it known that I, HERMAN WINTER, of the city of Brooklyn, in the county of Kings and State of New York, have invented certain new and useful Improvements in Gearing-Lubricators; and I do hereby declare that the following specification, taken in connection with the drawings furnished and forming a part of the same, is a clear, true, and complete description of my invention.

Although said improvements are applicable to cog-gearing generally, they have been specially devised by me for use with worm-gearing, and the object thereof is to secure a reliable, uniform, and neat application of lubricating matter to the teeth of gears.

In its simplest form my invention consists in the combination, with a suitable pan or receptacle for lubricating matter, of a rotary distributer provided with radial arms which mesh with the teeth of a gear to be lubricated, whereby oil or other lubricant is applied to the working-surfaces of said gear-teeth consecutively. I have, however, devised a special form of distributer, which has not only radial arms with which gear-teeth engage, but also brushes, or their equivalent, for conveying the lubricating matter from the pan to the gear-teeth.

To more particularly describe my invention, I will refer to the accompanying drawings, in which—

Figure 1:
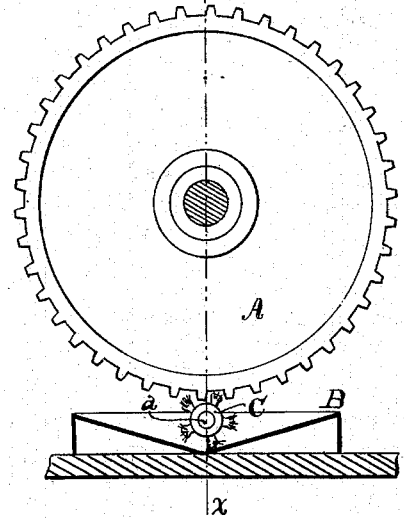
Figure 2:
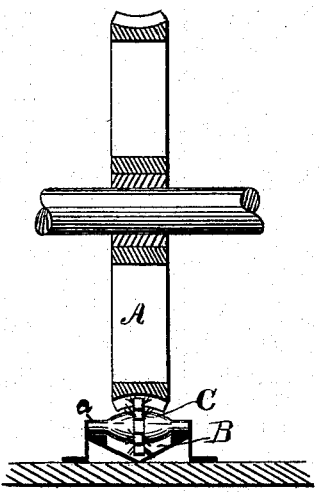
Figure 3:
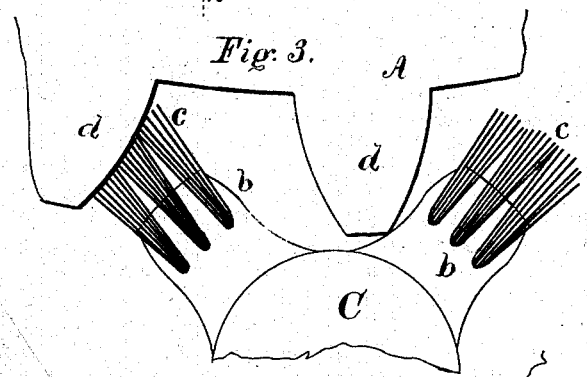
Figure 4:
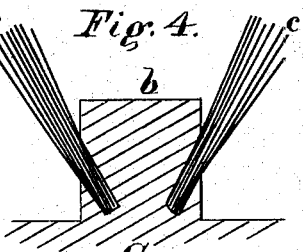
Figure 5:
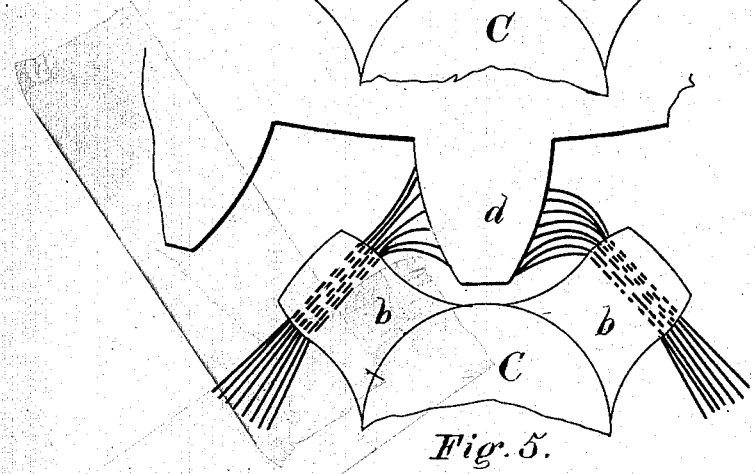
Figure 6:
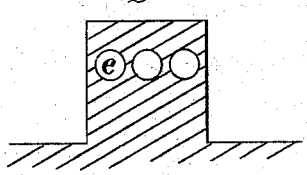

Figure 1 is a side view of my gearing-lubricator in its best form, as used with a worm-gear, the oil-pan being in longitudinal vertical section. Fig. 2 is a vertical section on line $x\ x$, Fig. 1. Fig. 3 is an enlarged side view of a portion of the gear and the distributer. Fig. 4 is a transverse section of one of the radial arms of the distributer. Fig. 5 is an enlarged side view of portions of a gear and of another form of distributer. Fig. 6 is a transverse section of one of the distributer-arms, Fig. 5.

It is to be understood that, although a worm-gear, A, is here shown, other forms of gears may be similarly lubricated.

A suitable pan or receptacle, B, is necessarily provided; but it can be largely varied in its form and construction without departing from my invention, although I deem it advisable that it have an inclined bottom, so as to insure a supply of fluid lubricant at the central or lowest portion of the pan.

The distributer C is rotatively mounted in said pan by means of a spindle or axis, $a$, and suitable boxes or bearings in or secured to the sides of the pan. In its general form said distributer resembles a pinion-gear having radial arms $b$, with which the teeth of the gear to be lubricated mesh during rotation. Good results will accrue if said arms be alone relied upon to convey oil from the pan to the gear; but better results are obtained by providing said arms with angularly-projecting brushes $c$, the tufts of bristles or other filamentous material being inserted into inclined holes in the sides of said arms, and with their outer ends extending beyond the ends of the radial arms, as clearly indicated in Figs. 3 and 4. With the distributer as thus constructed it will be seen that only the ends of the bristles need travel in the lubricant, and that the rotation of the distributer is caused by contact of the gear-teeth $d$ with the arms $b$ without undue wear of the brushes, and also that with the distributer located as shown in Fig. 2 the lubricant is applied only to the central portions of each gear-tooth in desirably small quantities, the meshing with a worm or with the teeth of another gear causing a lateral distribution on each tooth.

If an excessive degree of lubrication is desired, the distributer is provided with brushes in each arm which project into the intervening spaces, as indicated in Fig. 5, the brush material being in long tufts and occupying holes $e$, Fig. 6, so as to form separate brushes on the opposite sides of each arm, but in most cases I prefer the brushes as shown in Figs. 3 and 4.

In some cases, as in high-speed gearing, a shield will be advisable, both in front and at the rear of the distributer, to prevent the lubricating matter from being thrown outside of the pan; and it is also sometimes advisable that the receptacle be vertically adjustable, and the distributer also capable of vertical adjustment with relation to the pan, so as to vary the carrying capacity of the lubricator, and also so as to vary its degree of contact with the gear-teeth to be lubricated.

The prime value of my improvements will be realized in connection with machines which are inactive for a great portion of the time, it being well known that in such cases fresh lubrication is essential whenever service is required, and I find my lubricator of special value when applied to gearing in power capstans and windlasses used on ships, and especially to the worm-gearing usually employed in that connection.

In some cases the lubricating-pan with the rotary distributer is applied as an integral part of a machine, and sometimes as a separate lubricating device.

I am well aware that it is not new to employ rotating distributers of lubricating matter in connection with journals; but I know of no such device prior to my invention which could be arranged to lubricate the working-faces of gear-teeth as hereinbefore described.

Having thus described my invention, I claim as new and desire to secure by Letters Patent—

1. The combination, with a cogged wheel or gear, of a rotary distributer and a pan for a lubricant, substantially as hereinbefore described, whereby said gear is lubricated on the face of each tooth during the rotation of said gear, as set forth.

2. The combination of a receptacle or pan for lubricating material and a rotary distributer provided with radial arms, substantially as described.

3. The rotary distributer having radial arms and brushes, in combination with a pan for lubricant, substantially as described.

4. The combination, with a pan for lubricating matter, of a rotary distributer having radial arms, and tufts of bristles projecting angularly from the sides of said arms and beyond their ends, substantially as described.

HERMAN WINTER.

Witnesses:
JACOB S. VAN WYCK,
WILLIAM J. DRISCOLL.